United States Patent
Yoshimura

(10) Patent No.: US 8,160,505 B2
(45) Date of Patent: Apr. 17, 2012

(54) WIRELESS COMMUNICATION APPARATUS, PROGRAM, WIRELESS COMMUNICATION METHOD AND WIRELESS COMMUNICATION SYSTEM

(75) Inventor: Osamu Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 12/113,583

(22) Filed: May 1, 2008

(65) Prior Publication Data

US 2008/0287069 A1 Nov. 20, 2008

(30) Foreign Application Priority Data

May 15, 2007 (JP) ................ P2007-129654

(51) Int. Cl.
- G06F 11/00 (2006.01)
- H04J 1/16 (2006.01)
- H04J 3/14 (2006.01)
- H04L 1/00 (2006.01)

(52) U.S. Cl. ........... 455/69; 370/252; 370/328; 370/329

(58) Field of Classification Search ........... 455/69; 370/329, 328, 252

See application file for complete search history.

(56) References Cited

U.S. PATENT DOCUMENTS

| | | | | |
|---|---|---|---|---|
| 5,464,087 | A * | 11/1995 | Bounds et al. | 194/200 |
| 6,671,266 | B1 * | 12/2003 | Moon et al. | 455/69 |
| 6,928,054 | B1 * | 8/2005 | Montuno et al. | 370/235 |
| 7,421,528 | B1 * | 9/2008 | Yin et al. | 710/105 |
| 2002/0111144 | A1 * | 8/2002 | Schiff | 455/69 |
| 2004/0077353 | A1 * | 4/2004 | Mahany | 455/448 |
| 2004/0165575 | A1 * | 8/2004 | Yang et al. | 370/349 |
| 2005/0130692 | A1 * | 6/2005 | Furukawa et al. | 455/522 |
| 2005/0220145 | A1 * | 10/2005 | Nishibayashi et al. | 370/474 |
| 2006/0087998 | A1 * | 4/2006 | Saito et al. | 370/328 |
| 2006/0156203 | A1 * | 7/2006 | Naoi | 714/776 |
| 2008/0002790 | A1 * | 1/2008 | Itoh | 370/310 |

FOREIGN PATENT DOCUMENTS

| | | |
|---|---|---|
| JP | 2006-197173 | 7/2006 |
| JP | 2006-319395 | 11/2006 |

OTHER PUBLICATIONS

IEEE P802.11n™/D1.10; Draft Standard for Information Technology—Telecommunications and information exchange between systems—Local and metropolitan area networks—Specific requirements—Jan. 2007.

IEEE STD 802.11e-2005, IEEE Computer Society, Nov. 11, 2005, pp. 98-99.

Japanese Office Action for Japanese Patent Application No. 2007-129654, Mar. 19, 2009.

* cited by examiner

*Primary Examiner* — Temesgh Ghebretinsae
*Assistant Examiner* — Gennadiy Tsvey
(74) *Attorney, Agent, or Firm* — Finnegan, Henderson, Farabow, Garrett & Dunner, L.L.P.

(57) ABSTRACT

A wireless communication apparatus includes a transmitting portion to transmit a data signal to other wireless communication apparatus, a receiving portion to receive a reception confirmation signal indicating reception of the data signal by the other wireless communication apparatus from the other wireless communication apparatus during a specified period, a determination portion to determine that a predetermined requirement is satisfied if the receiving portion receives a given signal during the specified period, and a control portion to control the transmitting portion to request the other wireless communication apparatus to retransmit the reception confirmation signal if the receiving portion does not normally receive the reception confirmation signal and the determination portion determines that the predetermined requirement is satisfied.

12 Claims, 13 Drawing Sheets

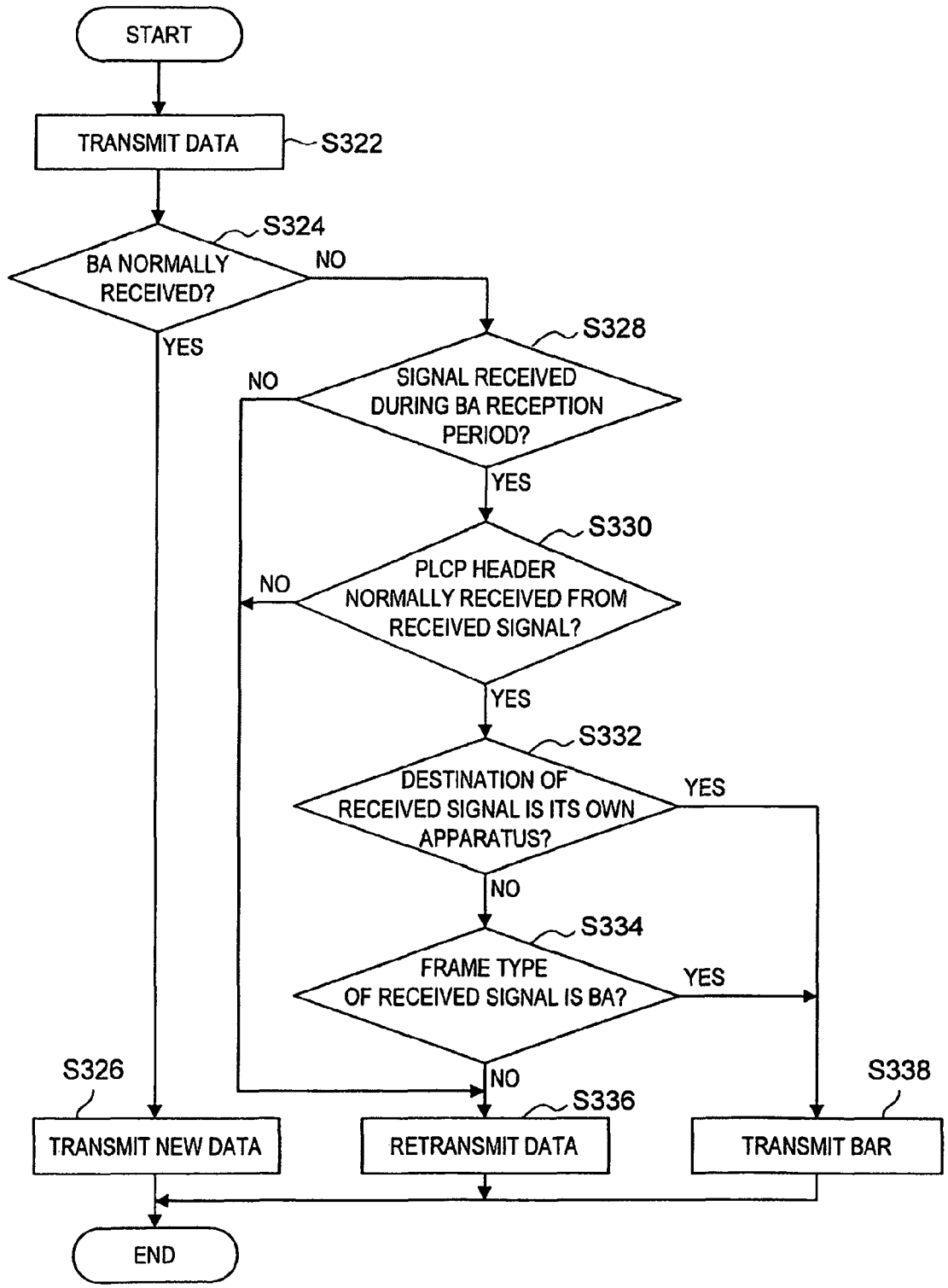

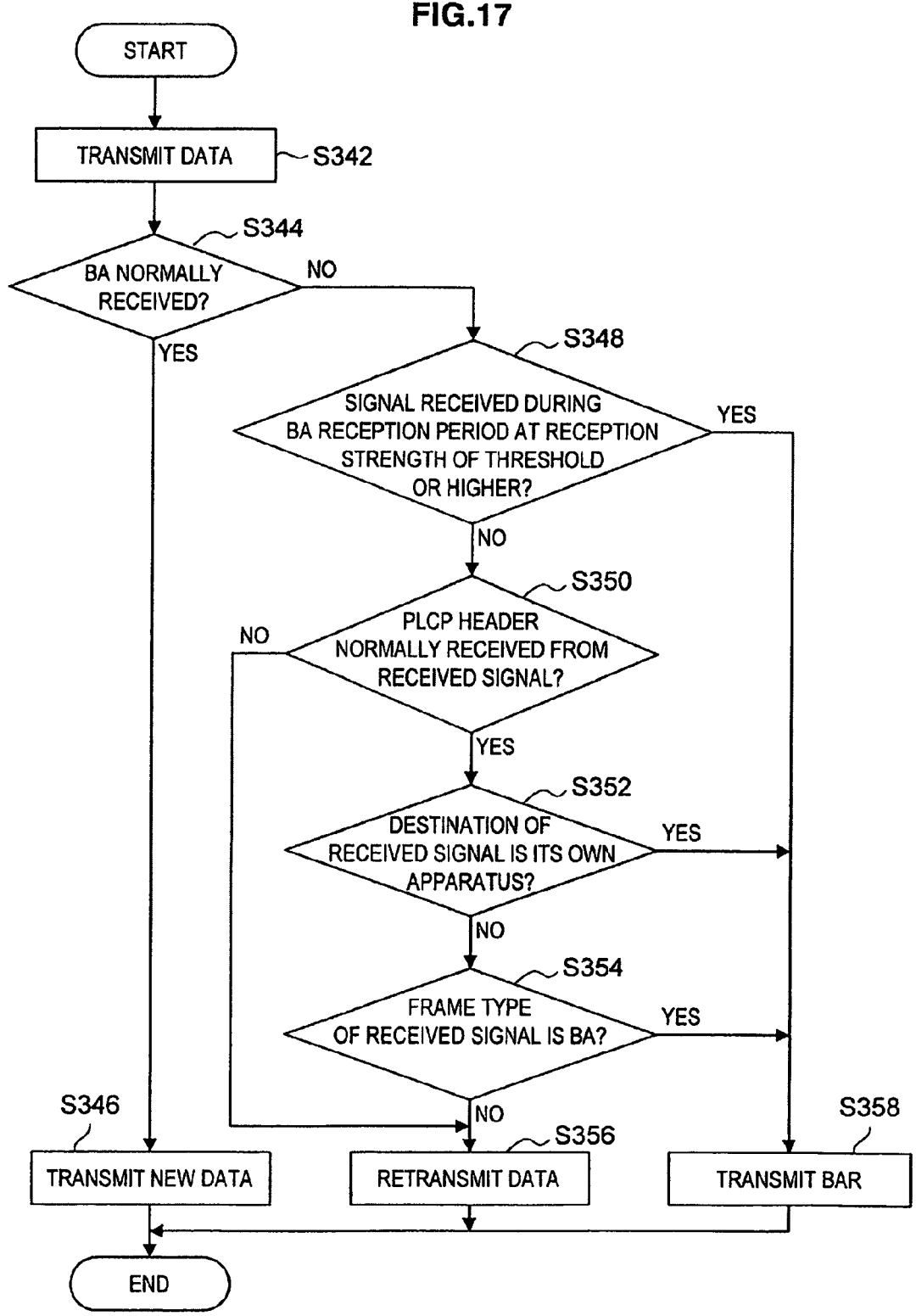

WIRELESS COMMUNICATION APPARATUS, PROGRAM, WIRELESS COMMUNICATION METHOD AND WIRELESS COMMUNICATION SYSTEM

CROSS REFERENCES TO RELATED APPLICATIONS

The present invention contains subject matter related to Japanese Patent Application JP 2007-129654 filed in the Japan Patent Office on May 15, 2007, the entire contents of which being incorporated herein by reference.

BACKGROUND OF THE INVENTION

1. Field of the Invention

The present invention relates to a wireless communication apparatus, a program, a wireless communication method and a wireless communication system.

2. Description of the Related Art

A wireless communication system based on the IEEE (Institute of Electrical and Electronic Engineers) 802.11 standards has been widespread. A wireless communication apparatus which constitutes such a wireless communication system is more advantageous than a wired communication system in that it has a high degree of flexibility such as portability. Further, an application which is used in each wireless communication apparatus becomes various, and a transmission speed which is demanded for a wireless communication system increases accordingly.

For example, according to "IEEE 802.11n" (prepared by the 802.11 Working Group of the 802 Committee, 2007), a plurality of MPDU (Mac Protocol Data Unit), which is a unit of transmission data in a MAC (Media Access Control) layer, are grouped into one MAC frame (which is referred to hereinafter as A-MPDU (Aggregate MPDU)). When an apparatus at the transmitting end transmits the A-MPDU packet, an apparatus at the receiving end transmits BA (Block ACK) as a reception confirmation signal indicating how many units of A-MPDU packet are received. If the apparatus at the transmitting end does not normally receive BA, it may transmit BAR (BA Request) for requesting the apparatus at the receiving end to retransmit BA.

If the apparatus at the transmitting end does not normally receive BA during a specified period where BA is expected to be received, the apparatus may perform any one of the following processing:

(1) Retransmitting an A-MPDU packet;
(2) Transmitting BAR; or
(3) Transmitting a new A-MPDU packet.

SUMMARY OF THE INVENTION

However, when the apparatus at the receiving end normally receives an A-MPDU packet but the apparatus at the transmitting end fails to receive BA, the retransmission of the A-MPDU packet as in the above processing (1) causes needless communication. On the other hand, when the apparatus at the receiving end does not normally receive an A-MPDU packet, it is more efficient to retransmit the A-MPDU packet than to transmit BAR from the apparatus at the transmitting end as in the above processing (2). Further, in view of a data buffer in the apparatus at the receiving end, even if the apparatus at the transmitting end transmits a new A-MPDU packet as in the above processing (3), it is likely that the apparatus at the receiving end fails to receive it normally.

Thus, if one of the above processing (1) to (3) is always performed when the apparatus at the transmitting end fails to receive BA, needless data is transmitted and received, which causes a decrease in the efficiency of wireless communication.

In light of the foregoing, there is a need for new, improved wireless communication apparatus, program, wireless communication method and wireless communication system which perform dynamic processing when a reception confirmation signal is not normally received and thereby improve the efficiency of wireless communication.

According to an embodiment of the present invention, there is provided a wireless communication apparatus including a transmitting portion to transmit a data signal to other wireless communication apparatus, a receiving portion to receive a reception confirmation signal indicating reception of the data signal by the other wireless communication apparatus from the other wireless communication apparatus during a specified period, a determination portion to determine that a predetermined requirement is satisfied if the receiving portion receives a given signal during the specified period, and a control portion to control the transmitting portion to request the other wireless communication apparatus to retransmit the reception confirmation signal if the receiving portion does not normally receive the reception confirmation signal and the determination portion determines that the predetermined requirement is satisfied.

In this configuration, if the receiving portion receives a given signal during a specified period where a reception confirmation signal is expected to be received from the other wireless communication apparatus, the determination portion determines that a predetermined requirement is satisfied. If the receiving portion does not normally receive the reception confirmation signal but it receives a given signal during the specified signal, there is a possibility that the given signal is the reception confirmation signal. In this case, there is a possibility that the data signal which is transmitted from the transmitting portion is received by the other wireless communication apparatus. Further, it is inefficient to transmit the same data signal from the transmitting portion when the data signal which is transmitted from the transmitting portion is received by the other wireless communication apparatus. Thus, if the determination portion determines that a predetermined requirement is satisfied, it is likely that the data signal which is transmitted from the transmitting portion is received by the other wireless communication apparatus, and the control portion controls the transmitting portion to request the other wireless communication apparatus to retransmit the reception confirmation signal. It is thereby possible to suppress the useless retransmission of the data signal and improve the efficiency of wireless communication.

The determination portion may determine that the requirement is satisfied further if a reception strength of the given signal is equal to or higher than a threshold. In this configuration, if the receiving portion receives a given signal at a reception strength that is equal to or higher than a threshold during a specified period, the control portion controls the transmitting portion to request the other wireless communication apparatus to retransmit the reception confirmation signal. By adding the condition that the reception strength of the given signal is equal to or higher than a threshold to the requirements, it is possible to increase the accuracy of the determination whether the given signal is the reception confirmation signal, thereby suppressing the case that the transmitting portion requests the retransmission of the reception confirmation signal when the other wireless communication apparatus does not receive the data signal.

The determination portion may determine that the requirement is satisfied further if a preamble is detected from the given signal. In this configuration, if a preamble is detected from the given signal which is received by the receiving portion during the specified signal, the control portion controls the transmitting portion to request the other wireless communication apparatus to retransmit the reception confirmation signal. By adding the condition that a preamble is detected from the given signal to the requirements, it is possible to suppress the case where the determination portion determines that the requirement is satisfied when the given signal is not the reception confirmation signal.

The given signal may contain error detection data for detecting an error of data represented by the given signal, and the determination portion may determine that the requirement is satisfied further if an error is detected from data represented by the given signal based on the error detection data. In this configuration, if an error is detected from data represented by the given signal based on the error detection data, the control portion controls the transmitting portion to request the other wireless communication apparatus to retransmit the reception confirmation signal. As a result, it is possible to increase the accuracy of the determination whether the given signal is the reception confirmation signal, thereby improving the efficiency of wireless communication.

The determination portion may determine that the requirement is satisfied further if a destination of the given signal is its own apparatus. In this configuration, if the destination of the given signal which is received by the receiving portion during the specified period is its own apparatus, the control portion controls the transmitting portion to request the other wireless communication apparatus to retransmit the reception confirmation signal. The reception confirmation signal is a signal which is transmitted to its own apparatus at a specified time. Thus, if the destination of the given signal which is received by the receiving portion at a specified time is its own device, there is a high possibility that the signal is the reception confirmation signal. Thus, if the destination of the given signal which is received by the receiving portion at a specified time is its own device, it is likely that the data signal which is transmitted from the transmitting portion is received by the other wireless communication apparatus. Accordingly, if the destination of the given signal which is received by the receiving portion at a specified time is its own device, the transmitting portion requests the other wireless communication apparatus to retransmit the reception confirmation signal, thereby enabling smooth wireless communication.

The determination portion may determine that the requirement is satisfied further if the given signal is a data frame of the reception confirmation signal. In this configuration, if the given signal which is received by the receiving portion during the specified period is a data frame of the reception confirmation signal, the control portion controls the transmitting portion to request the other wireless communication apparatus to retransmit the reception confirmation signal. By adding the condition that the given signal is a data frame of the reception confirmation signal, it is possible to suppress the case where the determination portion determines that the requirement is satisfied when the given signal is not the reception confirmation signal.

The determination portion may determine that the requirement is satisfied further if a data amount of the given signal is the same as or similar to a data amount of the reception confirmation signal. In this configuration, if the data amount of the given signal which is received by the receiving portion during the specified period is the same as or similar to the data amount of the reception confirmation signal, the control portion controls the transmitting portion to request the other wireless communication apparatus to retransmit the reception confirmation signal.

The wireless communication apparatus may further include a storage portion to store a reception history indicating a reception result of the reception confirmation signal by the receiving portion, and a threshold setting portion to dynamically set the threshold based on the reception history stored in the storage portion. In this configuration, the threshold setting portion sets the threshold of a reception strength appropriately based on the reception history, and it is therefore possible to enhance the accuracy of the determination by the determination portion.

The determination portion may determine that the requirement is satisfied if a destination of the given signal is its own apparatus or the given signal is a data frame of the reception confirmation signal and if an error is detected from data represented by the given signal based on the error detection data. In this configuration, by combining a plurality of conditions, it is possible to increase the accuracy of the determination whether the given signal is the reception confirmation signal, thus improving the efficiency of wireless communication.

According to another embodiment of the present invention, there is provided a program for causing a computer to serve as a wireless communication apparatus which includes a transmitting portion to transmit a data signal to other wireless communication apparatus, a receiving portion to receive a reception confirmation signal indicating reception of the data signal by the other wireless communication apparatus from the other wireless communication apparatus during a specified period, a determination portion to determine that a predetermined requirement is satisfied if the receiving portion receives a given signal during the specified period, and a control portion to control the transmitting portion to request the other wireless communication apparatus to retransmit the reception confirmation signal if the receiving portion does not normally receive the reception confirmation signal and the determination portion determines that the predetermined requirement is satisfied.

The above program can cause a hardware resource of a computer including CPU, ROM, RAM or the like to execute the functions of the receiving portion, the transmitting portion, the determination portion and the control portion described above. It is therefore possible to cause a computer that implements the program to serve as the above-described wireless communication apparatus.

According to another embodiment of the present invention, there is provided a wireless communication method performed in a wireless communication apparatus which includes the steps of transmitting a data signal to other wireless communication apparatus, determining whether a given signal is received during a specified period where a reception confirmation signal indicating reception of the data signal by the other wireless communication apparatus is expected to be transmitted from the other wireless communication apparatus, and requesting the other wireless communication apparatus to retransmit the reception confirmation signal if the reception confirmation signal is not normally received and the given signal is received during the specified period.

According to another embodiment of the present invention, there is provided a wireless communication system including a plurality of wireless communication apparatus that wirelessly communicate with each other. Each wireless communication apparatus includes a transmitting portion to transmit a data signal to other wireless communication apparatus, a receiving portion to receive a reception confirmation signal indicating reception of the data signal by the other wireless communication apparatus from the other wireless communication apparatus during a specified period, a determination portion to determine that a predetermined requirement is satisfied if the receiving portion receives a given signal during the specified period, and a control portion to control the transmitting portion to request the other wireless communication apparatus to retransmit the reception confirmation signal if the receiving portion does not normally receive the reception confirmation signal and the determination portion determines that the predetermined requirement is satisfied.

According to the embodiments of the present invention described above, it is possible to perform dynamic processing when a reception confirmation signal is not normally received and thereby improve the efficiency of wireless communication.

BRIEF DESCRIPTION OF THE DRAWINGS

FIG. 16 is flowchart showing the flow of a second example of a wireless communication method performed in a wireless communication apparatus according to the embodiment.

FIG. 17 is flowchart showing the flow of a third example of a wireless communication method performed in a wireless communication apparatus according to the embodiment.

DETAILED DESCRIPTION OF THE PREFERRED EMBODIMENTS

Figure 1:
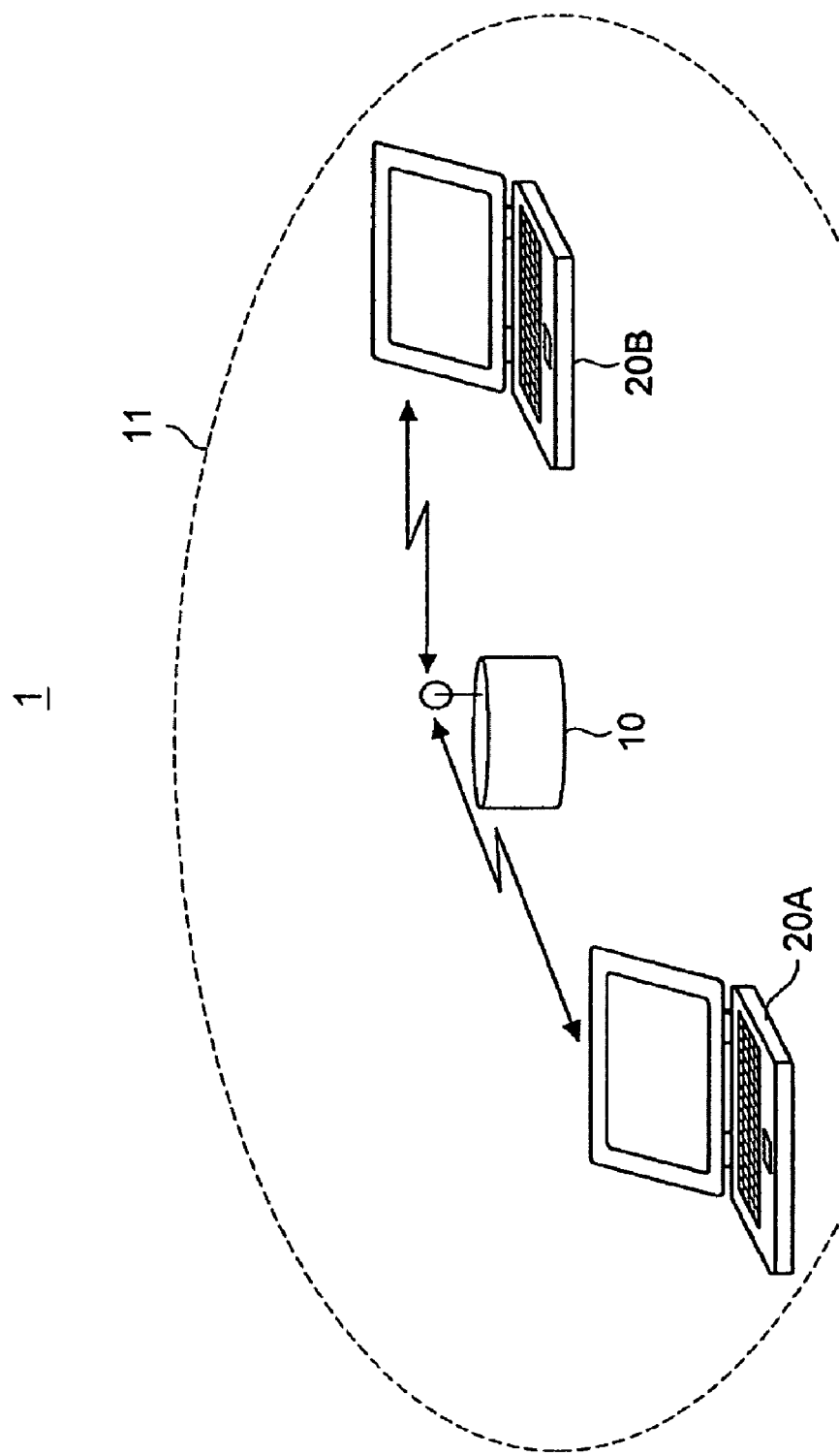
FIG. 1 is an illustration showing an example of the configuration of a wireless communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described in the following order:

(1) Outline of the wireless communication system according to an embodiment of the present invention
  (1-1) Configuration of the wireless communication system
  (1-2) Exemplary format of data communicated over the wireless communication system
  (1-3) Objective of the wireless communication system according to the embodiment of the present invention
(2) Configuration of the wireless communication apparatus which constitutes the wireless communication system
  (2-1) Hardware configuration of the wireless communication apparatus
  (2-2) Function of the wireless communication apparatus
(3) Wireless communication method performed in the wireless communication system
  (3-1) First example of the wireless communication method
  (3-2) Second example of the wireless communication method
  (3-3) Third example of the wireless communication method
(4) Summary (1) Outline of the Wireless Communication System According to an Embodiment of the Present Invention (1-1) Configuration of the Wireless Communication System The configuration of a wireless communication system 1 according to an embodiment of the present invention is described hereinafter with reference to FIG. 1.

FIG. 1 is an illustration showing an example of the configuration of the wireless communication system 1 according to the embodiment. Referring to FIG. 1, the wireless communication system 1 includes a base station 10 and wireless communication apparatus 20A and 20B.

The base station 10 is an access point of a wireless LAN (Local Area Network), for example, and it transfers wireless communication between the wireless communication apparatus 20 which exist within a radio wave range 11 of the base station 10. For example, in the case where the wireless communication apparatus 20A transmits data to the wireless communication apparatus 20B, the wireless communication apparatus 20A transmits data to the base station 10, and then the base station 10 transmits the data which is received from the wireless communication apparatus 20A to the wireless communication apparatus 20B.

Further, the base station 10 may periodically transmit an annunciation signal, called a beacon, which contains management information of wireless communication, and the wireless communication apparatus 20 which receives the beacon may operate based on the management information that is contained in the beacon.

It is noted that FIG. 1 shows the wireless communication system 1 in infrastructure mode in which the base station 10 subjectively manages wireless communication by way of illustration only, and the wireless communication system 1 may be in ad-hoc mode in which the wireless communication apparatus 20 autonomously perform wireless communication without a control center such as the base station 10.

It is also noted that FIG. 1 shows a PC (Personal Computer) as an example of the wireless communication apparatus 20 by way of illustration only, and the wireless communication apparatus 20 may be other information processing apparatus such as a home video processing unit (e.g. a DVD recorder, a videocassette recorder etc.), a cellular phone, a PHS (Personal Handyphone System), a portable sound playback unit, a portable video processing unit, a PDA (Personal Digital Assistant), a home game device, a portable game device, and an electrical household appliance.

(1-2) Exemplary Format of Data Communicated Over the Wireless Communication System An exemplary format of each data which is communicated between the wireless communication apparatus 20 is described hereinafter with reference to FIGS. 2 to 7. Specifically, exemplary formats of MPDU (Mac Protocol Data Unit), A-MPDU (Aggregate MPDU), BA (Block ACK) and BAR (BA Request) are described hereinbelow.

Figure 2:
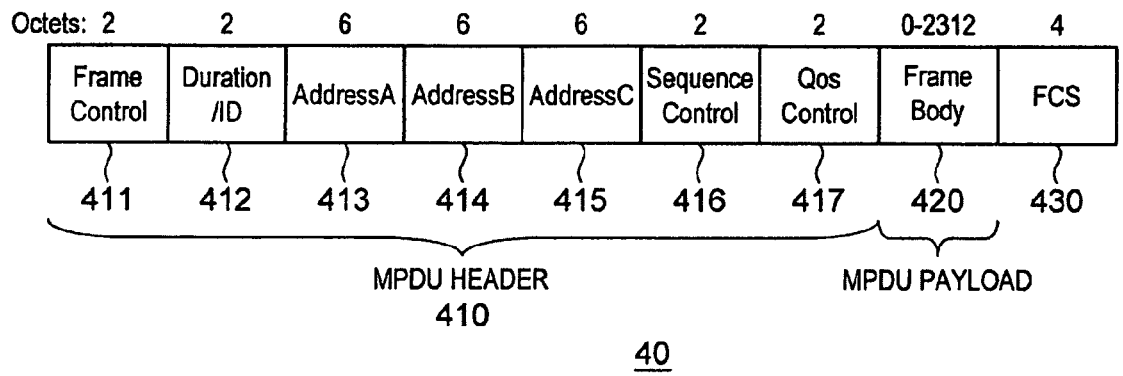
FIG. 2 is an illustration showing an exemplary format of a data packet.

FIG. 2 is an illustration showing an exemplary format of a data packet 40. As shown in FIG. 2, the format of the data packet 40 contains an MPDU header 410, an MPDU payload 420 and an FCS 430. The MPDU header 410 contains Frame Control 411, Duration/ID 412, Address A 413, Address B 414, Address C 415, Sequence Control 416 and Qos Control 417.

The Frame Control 411 indicates the scheme of a data frame which contains the Frame Control 411, for example. Specifically, it has a format shown in FIG. 3.

The Duration/ID 412 describes time, for example, and a predetermined wireless communication apparatus enters wait-before-transmit state (NAV) during the time which is described in the Duration/ID 412. The Address A 413 may describe the address of the base station 10, the Address B 414 may describe the address of an apparatus at the transmitting end of the data frame, and the Address C 415 may describe the address of a wireless communication apparatus which is the destination of the data frame. The Sequence Control 416 describes a sequence number of the data packet 40, for example.

The MPDU payload 420 is real data which is transmitted by the data packet 40. The FCS 430 has a function to detect an error in the data packet 40.

Figure 3:
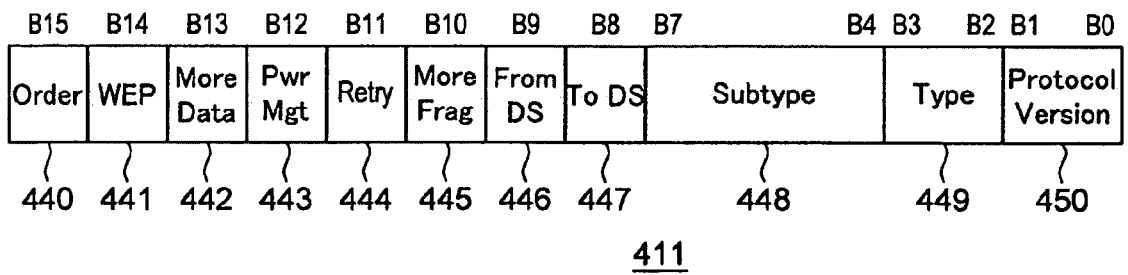
FIG. 3 is an illustration showing a detailed structure of Frame Control.

FIG. 3 is an illustration showing a detailed structure of the Frame Control 411. As shown in FIG. 3, the Frame Control 411 contains Order 440, WEP 441, More Data 442, Pwr Mgt 443, Retry 444, More Frag 445, From DS 446, To DS 447, Subtype 448, Type 449 and Protocol Version 450.

The Type 449 describes a frame type, and the Subtype 448 describes a subtype, which is a more detailed classification of the frame type. The frame type may be a control frame, a data frame or a management frame, for example. The subtype may be BA, ACK, RTS, CTS or BAR, for example.

Figure 4:
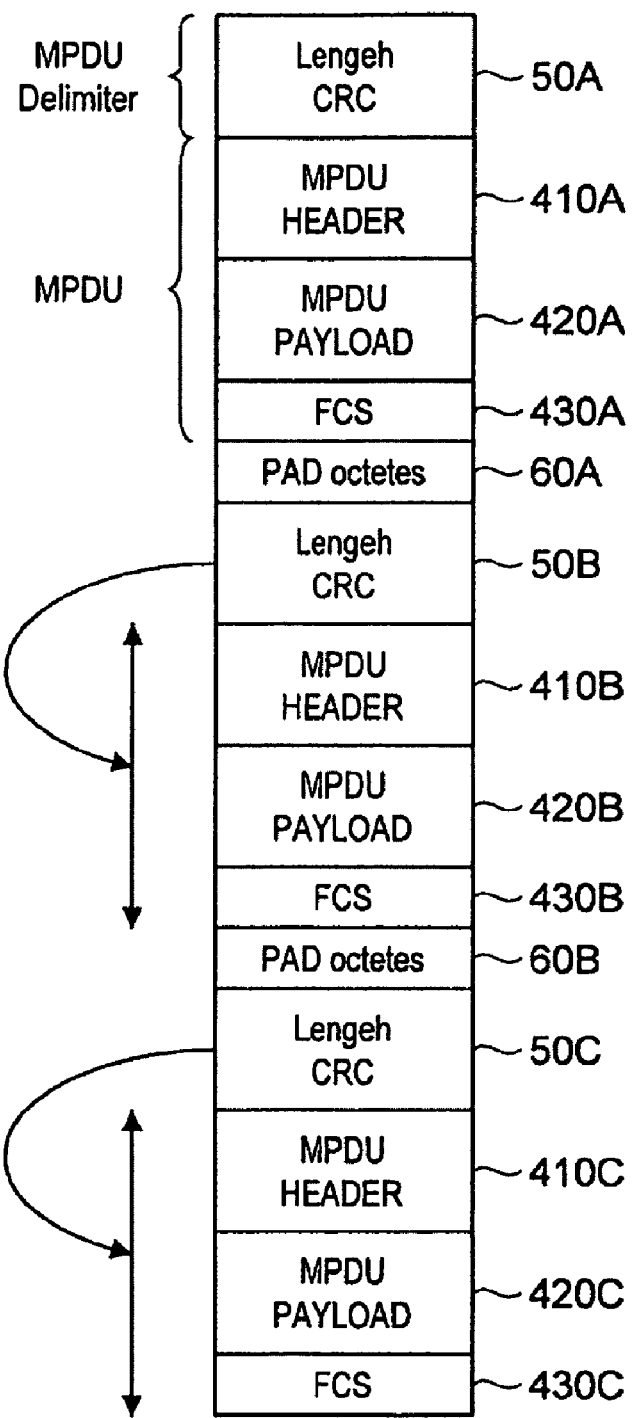
FIG. 4 is an illustration showing an exemplary structure of A-MPDU.
Figure 5:
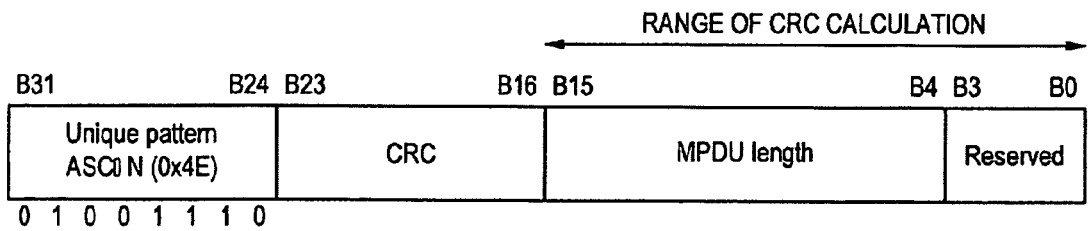
FIG. 5 is an illustration showing an exemplary format of MPDU Delimiter.

FIG. 4 is an illustration showing an exemplary structure of A-MPDU 42. As shown in FIG. 4, the A-MPDU 42 contains a plurality of data packets 40. Specifically, the A-MPDU 42 contains a plurality of data units, each including an MPDU Delimiter 50 which indicates a separation between MPDU, an MPDU header 410, an MPDU payload 420, an FCS 430 and a PAD octetes 60 which is added so that the length of the MPDU becomes an integral multiple of 4 bytes. The MPDU Delimiter 50 may have the format as shown in FIG. 5, for example, though not described in detail.

Figure 6:
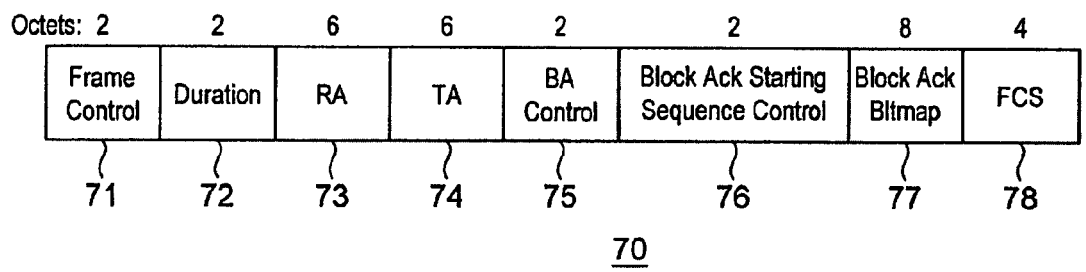
FIG. 6 is an illustration showing an exemplary format of BA.

FIG. 6 is an illustration showing an exemplary format of a BA 70. As shown in FIG. 6, the BA 70 contains Frame Control 71, Duration 72, RA 73, TA 74, BA Control 75, Block ACK Starting Sequence Control 76, Block ACK Bitmap 77 and FCS 78.

The Frame Control 71 has substantially the same format as the Frame Control 411 of the data packet 40 shown in FIG. 3. Thus, the Subtype 448 of the Frame Control 71 describes that it is the frame related to the BA 70. The Duration 72 describes a time of wait-before-transmit for a nearby wireless communication apparatus which receives the BA 70.

The RA 73 is the address of a destination wireless communication apparatus to which the BA 70 is transmitted, and the TA 74 is the address of an apparatus from which the BA 70 is transmitted. The BA Control 75 contains information indicating the state of the BA 70.

The Block ACK Starting Sequence Control 76 describes the first sequence number (n) of the MPDU which is contained in the A-MPDU that is received by a wireless communication apparatus 20 from another wireless communication apparatus 20B. The Block ACK Bitmap 77 describes "1" in the bit corresponding to the sequence number of the MPDU which is contained in the A-MPDU that is received by the wireless communication apparatus 20. For example, if the first sequence number of the MPDU which is contained in the A-MPDU is 100 and the wireless communication apparatus 20 normally receives the MPDU with the sequence numbers of 100, 102 and 103, the Block ACK Starting Sequence Control 76 describes "100", and the Block ACK Bitmap 77 describes "1011". The FCS 78 is information for detecting an error in the BA 70.

Figure 7:
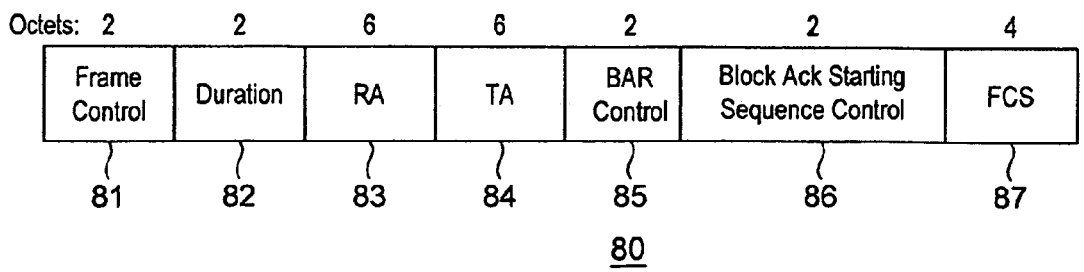
FIG. 7 is an illustration showing an exemplary format or BAR.

FIG. 7 is an illustration showing an exemplary format of a BAR 80. As shown in FIG. 7, the BAR 80 contains Frame Control 81, Duration 82, RA 83, TA 84, BAR Control 85, Block ACK Starting Sequence Control 86 and FCS 87.

The Frame Control 81 has substantially the same format as the Frame Control 411 of the data packet 40 shown in FIG. 3. Thus, the Subtype 448 of the Frame Control 81 describes that it is the frame related to the BAR 80. The Duration 82 describes a time of wait-before-transmit for a nearby wireless communication apparatus which receives the BAR 80.

The RA 83 is the address of a destination wireless communication apparatus to which the BAR 80 is transmitted, and the TA 84 is the address of an apparatus from which the BAR 80 is transmitted. The BAR Control 85 contains information indicating the state of the BAR 80.

The Block ACK Starting Sequence Control 86 is information indicating the sequence number of the MPDU which is at the head of the A-MPDU 42 of which the BA 70 is to be requested to the other wireless communication apparatus 20B. For example, if the wireless communication apparatus 20 requests the BA 70 of the A-MPDU 42 which includes the MPDU with the sequence number of 100 at the head, the Block ACK Starting Sequence Control 86 describes "100". The FCS 87 is information for detecting an error in the BAR 80.

(1-3) Objective of the Wireless Communication System According to the Embodiment of the Present Invention The transmission and reception of the above data and issues are described hereinafter with reference to FIGS. 8 to 10, and the objective of the wireless communication system 1 according to the embodiment of the present invention is described after that.

Figure 8:
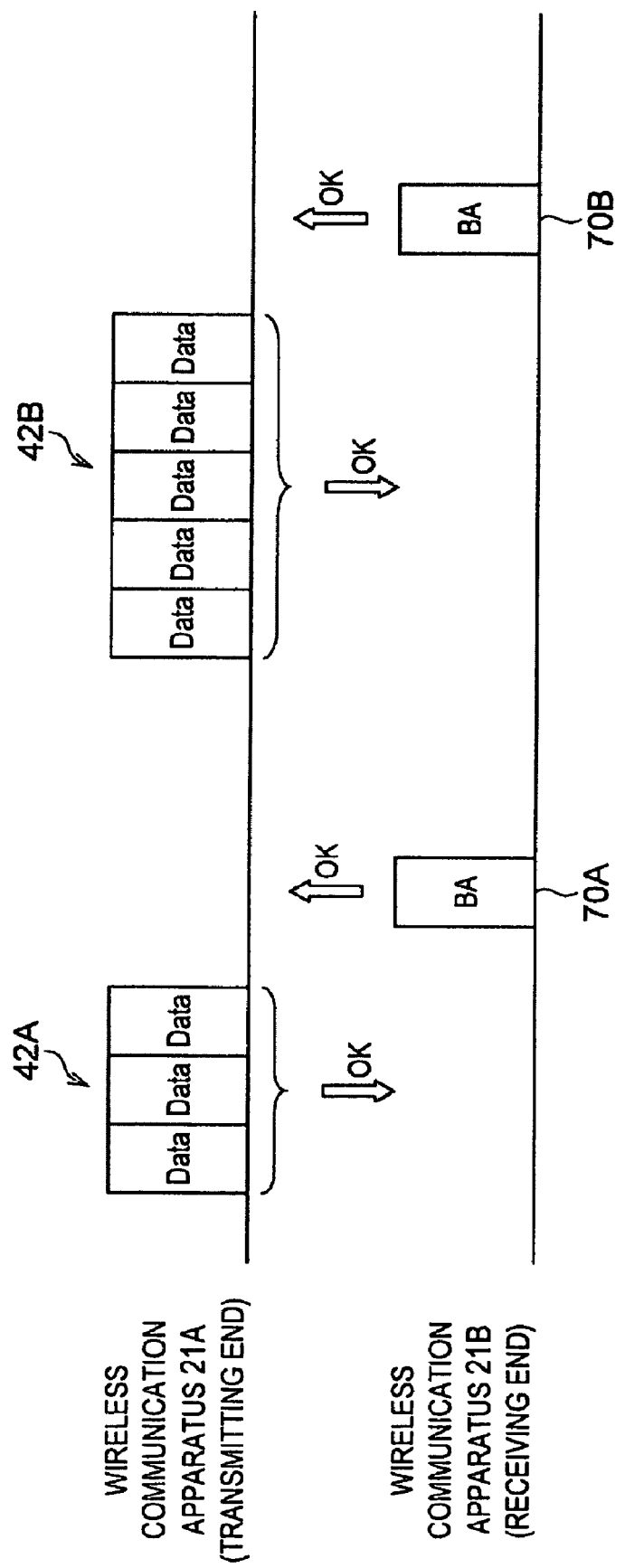
FIG. 8 is an illustration schematically showing wireless communication between wireless communication apparatus related to the embodiment.

FIG. 8 is an illustration schematically showing wireless communication between wireless communication apparatus 21 which are related to the embodiment. As shown in FIG. 8, when a wireless communication apparatus 21A transmits A-MPDU 42A which contains 3 units of MPDU to a wireless communication apparatus 21B, if the wireless communication apparatus 21B normally receives the A-MPDU 42A, the wireless communication apparatus 21B transmits BA 70A as a reception confirmation signal to the wireless communication apparatus 21A at a specified timing.

The wireless communication apparatus 21B may determine that it normally receives the A-MPDU 42A when an error is not detected from the A-MPDU 42A based on each FCS 430 which is contained in the A-MPDU 42A, for example. Although the specified timing may be SIFS (Short Interframe Space), it is not limited thereto as long as it is the timing which is shared with the wireless communication apparatus 21A in advance.

When the wireless communication apparatus 21A receives the BA 70A in response to the A-MPDU 42A during a BA reception period (specified period) where BA 70A is expected to be received, it transmits new A-MPDU 42B to the wireless communication apparatus 21B. If the wireless communication apparatus 21B normally receives the new A-MPDU 42B, it transmits BA 70B which indicates the normal reception of the A-MPDU 42B to the wireless communication apparatus 21A.

In this manner, the wireless communication apparatus 21A receives the BA 70 in response to the transmitted A-MPDU 42 from the wireless communication apparatus 21B. The wireless communication apparatus 21A thereby determines that the wireless communication apparatus 21B has normally received the A-MPDU 42 and then transmits the next A-MPDU 42.

Figure 9:
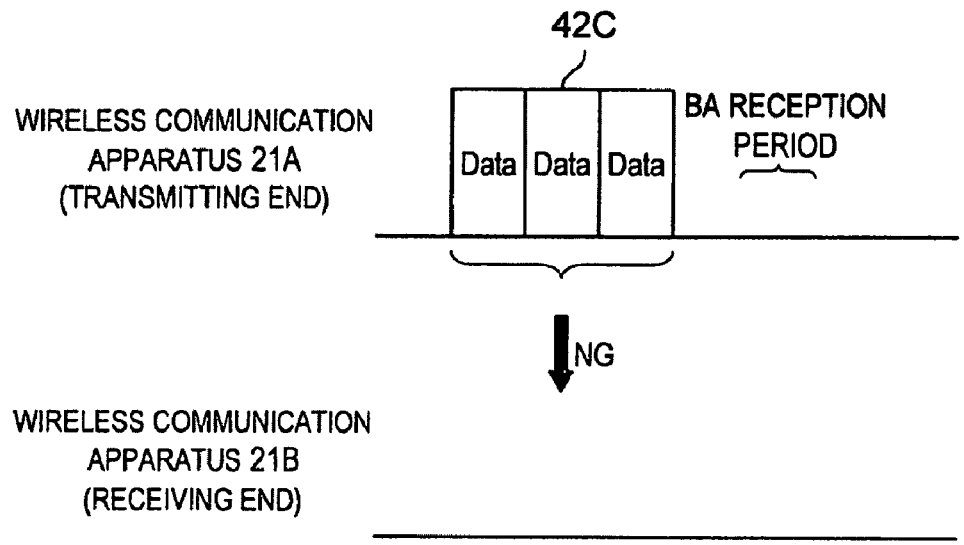
FIG. 9 is another illustration schematically showing wireless communication between wireless communication apparatus related to the embodiment.

FIG. 9 is another illustration schematically showing wireless communication between the wireless communication apparatus 21. As shown in FIG. 9, the wireless communication apparatus 21A transmits A-MPDU 42C which contains 3 units of MPDU to the wireless communication apparatus 21B. However, the wireless communication apparatus 21B fails to normally receive the A-MPDU 42C in some cases such as when a radio wave is weak, when a radio wave interferes and so on. In such cases, the wireless communication apparatus 21B does not transmit BA at a specified timing, and therefore the wireless communication apparatus 21A does not receive BA from the wireless communication apparatus 21B during the BA reception period.

Figure 10:
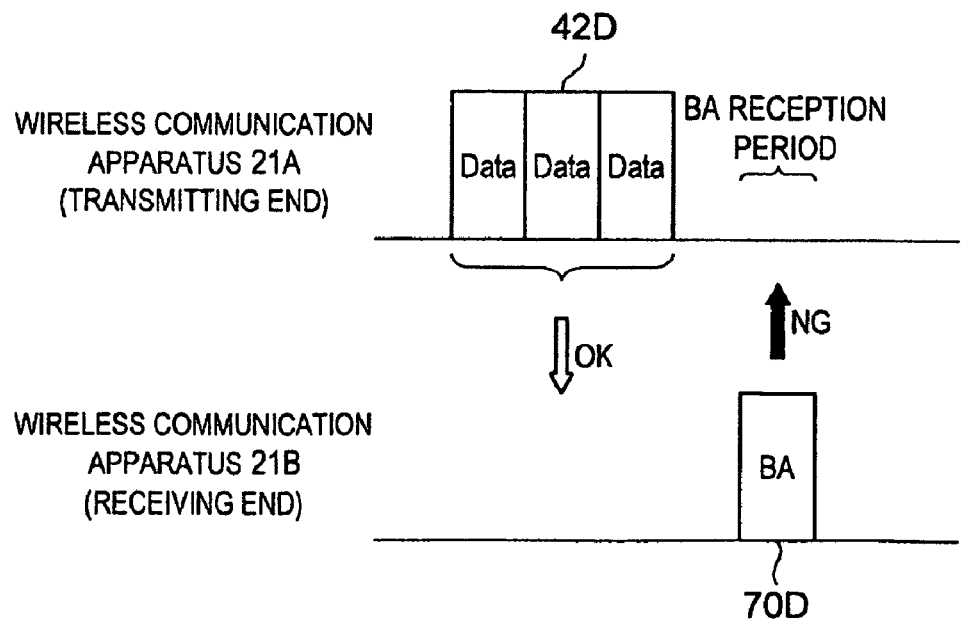
FIG. 10 is another illustration schematically showing wireless communication between wireless communication apparatus related to the embodiment.

On the other hand, as shown in FIG. 10, if the wireless communication apparatus 21B normally receives the A-MPDU 42D which is transmitted from the wireless communication apparatus 21A to the wireless communication apparatus 21B, the wireless communication apparatus 21B transmits BA 70D in response to the A-MPDU 42D at a specified timing. However, the wireless communication apparatus 21A fails to normally receive the BA 70D in some cases such as when a radio wave is weak, when a radio wave interferes and so on.

In both cases of FIGS. 9 and 10, even if the wireless communication apparatus 21A transmits the A-MPDU 42, it does not normally receive the BA 70 from the wireless communication apparatus 21B. FIG. 9 shows the case where the cause is that the wireless communication apparatus 21B fails to receive the A-MPDU 42. FIG. 10 shows the case where the cause is that, although the wireless communication apparatus 21B normally receives the A-MPDU 42 and transmits the BA 70, the wireless communication apparatus 21A fails to receive the BA 70 normally.

When the wireless communication apparatus 21A does not normally receive the BA 70 during the BA reception period, possible approaches include retransmitting the same A-MPDU 42, transmitting BAR 80 which requests retransmission of the BA 70 to the wireless communication apparatus 21B, and so on.

However, if the same A-MPDU 42 is always retransmitted when the wireless communication apparatus 21A does not normally receive the BA 70 during the BA reception period, the retransmission is needless communication in the case where the wireless communication apparatus 21B normally receives the A-MPDU 42 as shown in FIG. 10.

On the other hand, if the BAR 80 is always transmitted to the wireless communication apparatus 21B when the wireless communication apparatus 21A does not normally receive the BA 70 during the BA reception period, the transmission of the BAR 80 is needless communication in the case where the wireless communication apparatus 21B does not receive the A-MPDU 42 as shown in FIG. 9 because it is necessary to send back the information indicating that the A-MPDU 42 is not received by the BA 70 and then to retransmit the same A-MPDU 42.

Thus, if a fixed processing is always performed when the wireless communication apparatus 21A fails to receive the BA 70 from the wireless communication apparatus 21B, needless data is communicated to cause a decrease in the efficiency of wireless communication.

In view of the foregoing, the wireless communication apparatus 20 according to the embodiment of the present invention has been invented. The wireless communication apparatus 20 according to the embodiment performs dynamic processing when the BA 70 is not normally received and thereby improves the efficiency of wireless communication. The detailed configuration and the operation of the wireless communication apparatus 20 are described hereinafter.

Figure 11:
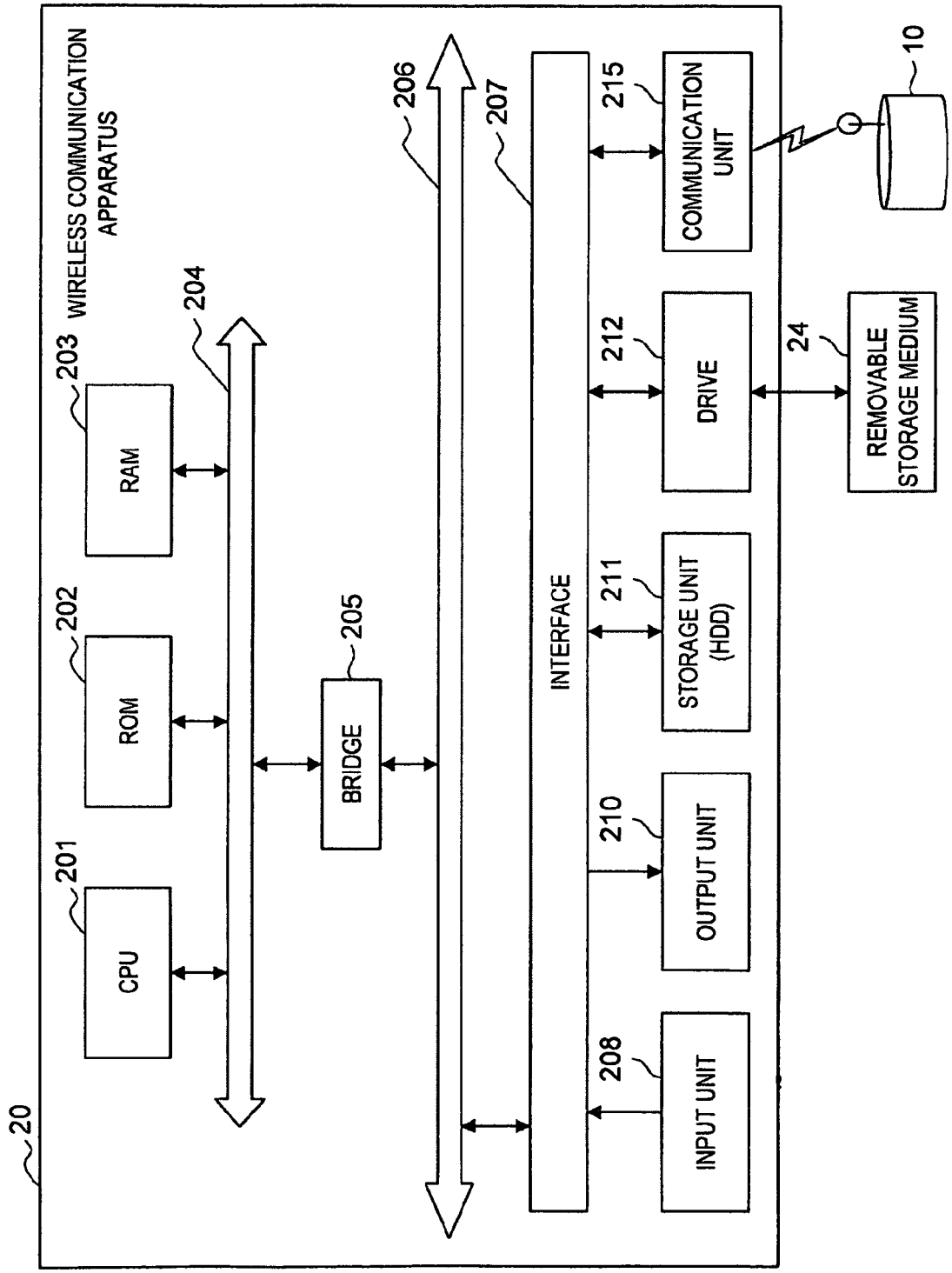
FIG. 11 is an illustration showing the hardware configuration of a wireless communication apparatus according to the embodiment.

(2) Configuration of the Wireless Communication Apparatus which Constitutes the Wireless Communication System (2-1) Hardware Configuration of the Wireless Communication Apparatus FIG. 11 is a block diagram showing the hardware configuration of the wireless communication apparatus 20 according to the embodiment. The wireless communication apparatus 20 includes a CPU (Central Processing Unit) 201, a ROM (Read Only Memory) 202, a RAM (Random Access Memory) 203, a host bus 204, a bridge 205, an external bus 206, an interface 207, an input unit 208, an output unit 210, a storage unit (HDD) 211, a drive 212, and a communication unit 215.

The CPU 201 serves as a processing unit and a control unit, and it controls the overall operation in the wireless communication apparatus 20 according to each program. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from each other, and their functions may be implemented by one bus.

The input unit 208 may include an input means for a user to input information, such as a mouse, a keyboard, a touch panel, a button, a microphone, a switch or a lever, and an input control circuit to generate an input signal based on a user input and output it to the CPU 201, for example. A user of the wireless communication apparatus 20 manipulates the input unit 208 to thereby input various data or instruct processing operation to the wireless communication apparatus 20.

The output unit 210 may include a display device such as a CRT (Cathode Ray Tube) display device, an LCD (Liquid Crystal Display) device, an OLED (Organic Light Emitting Display) device or a lamp, and a sound output device such as a speaker or a headphone, for example. The output unit 210 may output reproduced contents, for example. Specifically, the display device displays information such as reproduced video data by a text or an image. The sound output device converts reproduced sound data or the like into a sound and outputs it.

The storage unit 211 is a device for data storage that is configured as an example of a storage portion of the wireless communication apparatus 20 according to this embodiment. The storage unit 211 may include a storage medium, a recording device to record data into the storage medium, a reading device to read data from the storage medium, a deleting device to delete data recorded in the storage medium and so on. The storage unit 211 may be an HDD (Hard Disc Drive). The storage unit 211 drives a hard disk and stores a program to be executed by the CPU 201 or various data.

The drive 212 is a reader/writer for a storage medium, and it may be built in the wireless communication apparatus 20 or attached externally. The drive 212 reads information that is recorded on a removable storage medium 24 such as a magnetic disk, an optical disk, a magneto-optical disk or a semiconductor memory which is attached thereto and outputs the information to the RAM 203.

The communication unit 215 may be a communication interface that includes a communication device or the like to establish connection with the communication network 12. The communication unit 215 may be a communication device compatible with a wireless LAN (Local Area Network), a communication device compatible with a wireless USB, or a wire communication device that performs wired communication. The communication unit 215 may transmit/receive the A-MPDU 42, the BA 70, the BAR 80 and so on with the other wireless communication apparatus 21B, the base station 10 and so on.

(2-2) Function of the Wireless Communication Apparatus

The hardware configuration of the wireless communication apparatus 20 is described in the foregoing with reference to FIG. 11. In the followings, the function of the wireless communication apparatus 20 is described with reference to FIG. 12.

Figure 12:
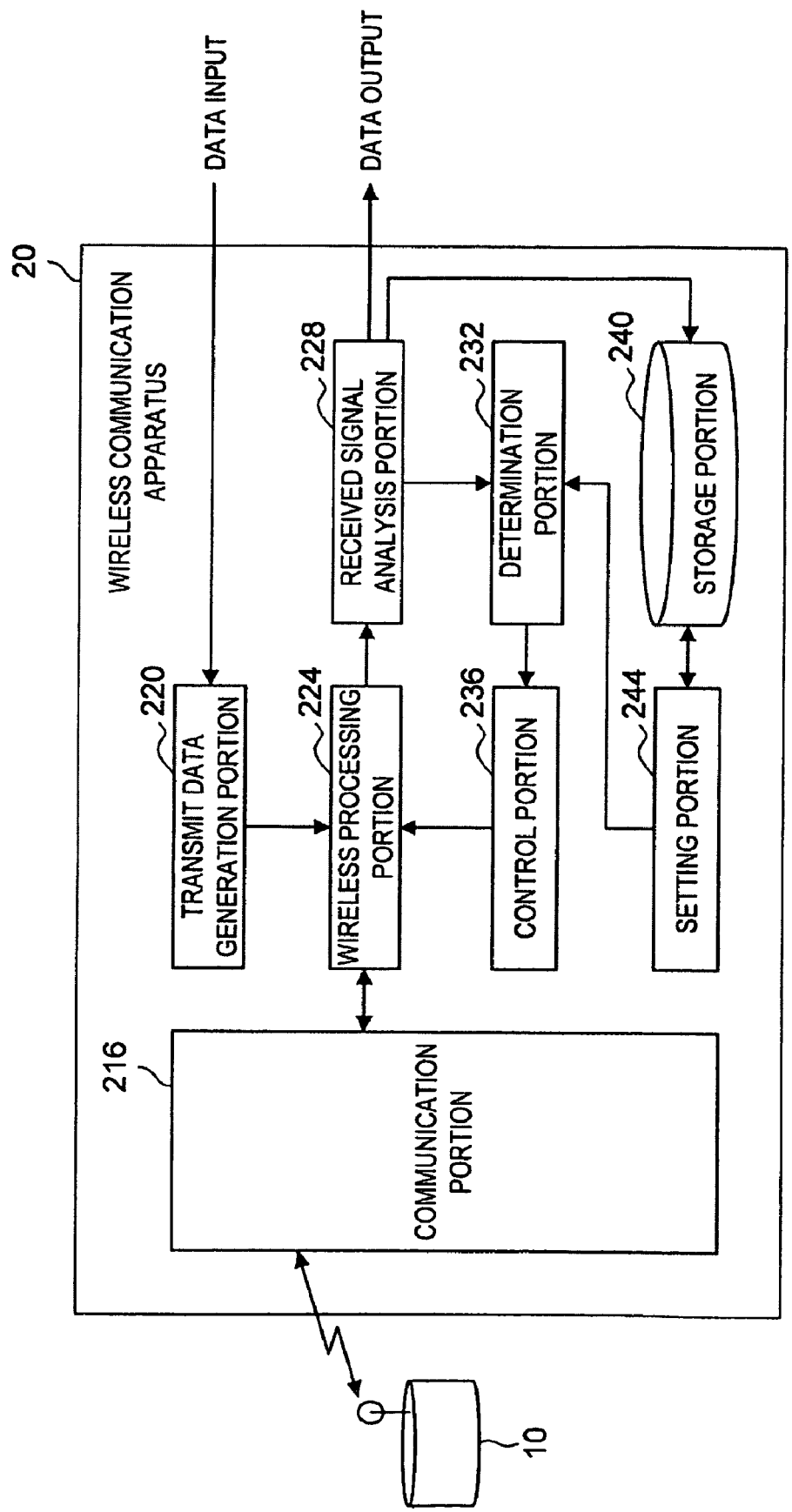
FIG. 12 is a functional block diagram showing the configuration of a wireless communication apparatus according to the embodiment.

FIG. 12 is a functional block diagram showing the configuration of the wireless communication apparatus 20 according to the embodiment. As shown in FIG. 12, the wireless communication apparatus 20 includes a communication portion 216, a transmit data generation portion 220, a wireless processing portion 224, a received signal analysis portion 228, a determination portion 232, a control portion 236, a storage portion 240 and a setting portion 244.

The communication portion 216 is an interface with the other wireless communication apparatus 20B which is connected via the base station 10, and it serves as a receiving portion and a transmitting portion. For example, the communication portion 216 communicates various data such as the A-MPDU 42, the BA 70 and the BAR 80 with the other wireless communication apparatus 20B.

The transmit data generation portion 220 generates the A-MPDU 42 as shown in FIG. 4 as an example of a data signal based on data which is input from application equipment that is connected with the wireless communication apparatus 20, for example. The A-MPDU 42 may contain music data such as music, lecture and radio program, video data such as movie, TV program, video program, photograph, document, picture and charts, or given data such as game and software, for example.

The wireless processing portion 224 performs modulation, processing or the like for converting the A-MPDU 42 which is generated by the transmit data generation portion 220 into a radio signal. The wireless processing portion 224 also modulates and processes a radio signal which is received from the other wireless communication apparatus 20B through the communication portion 216 and outputs the signal to the received signal analysis portion 228.

The received signal analysis portion 228 analyzes the signal which is input from the wireless processing portion 224 and outputs data which is obtained by the analysis to application equipment that is connected with the wireless communication apparatus 20, for example. The received signal analysis portion 228 also analyzes the signal which is input from the wireless processing portion 224, obtains the reception status of the radio signal which is received by the communication portion 216 from the other wireless communication apparatus 20B during the BA reception period and outputs it to the determination portion 232.

The reception status of a radio signal may be whether the communication portion 216 receives a given signal during the BA reception period, whether the reception strength of a received signal which is received by the communication portion 216 during the BA reception period is equal to or higher than a predetermined threshold, whether a preamble is detected from a received signal, whether an error is detected from a received signal based on FCS, whether a frame type of BA is described in the Subtype 448 of the Frame Control of a received signal, whether the address of its own apparatus is described the RA 73 of a received signal, and so on.

The determination portion 232 determines whether the reception status of a radio signal which is input from the received signal analysis portion 228 satisfies a predetermined requirement which is set by the setting portion 244. The control portion 236 makes control to transmit the BAR 80 from the communication portion 216 when the BA 70 is not normally received from the other wireless communication apparatus 20B during the BA reception period and the determination portion 232 determines that a predetermined requirement is satisfied. On the other hand, when the determination portion 232 determines that a predetermined requirement is not satisfied, the control portion 236 makes control to retransmit the A-MPDU 42 which has been transmitted most recently from the communication portion 216.

Thus, even when the communication portion 216 does not normally receive the BA 70 from the other wireless communication apparatus 20B during the BA reception period, if the communication portion 216 receives a signal which satisfies a predetermined requirement and is thus assumed to be the BA 70 during the BA reception period, the communication portion 216 transmits the BAR 80 to the other wireless communication apparatus 20B. The detail of the requirement is described later. A specific example of wireless communication between the wireless communication apparatus 20 is described hereinafter with reference to FIG. 13.

Figure 13:
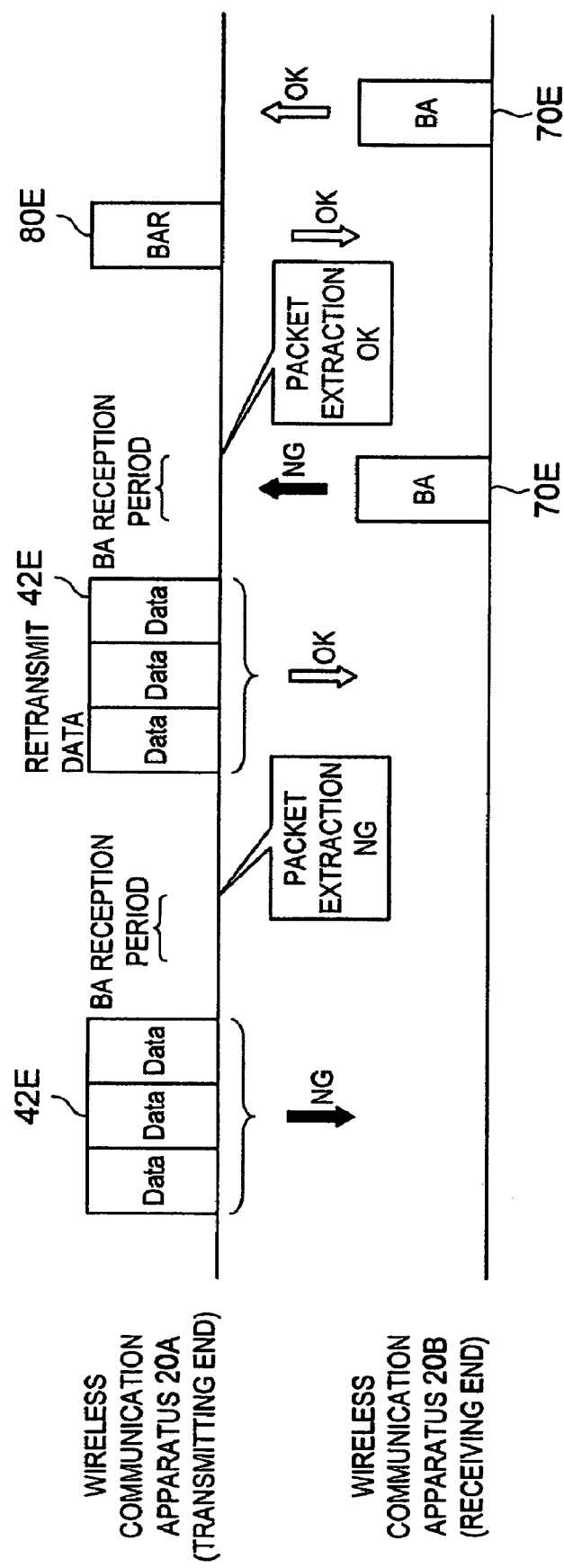
FIG. 13 is an illustration schematically showing wireless communication between wireless communication apparatus according to the embodiment.

FIG. 13 is an illustration schematically showing wireless communication between the wireless communication apparatus 20 according to the embodiment. FIG. 13 shows the case where it is determined that a requirement is satisfied when the wireless communication apparatus 20A receives a given signal during the BA reception period.

Specifically, the wireless communication apparatus 20A transmits A-MPDU 42E which contains three units of MPDU to the wireless communication apparatus 20A. However, the wireless communication apparatus 20B fails to normally receive the A-MPDU 42E in some cases such as when a radio wave is weak, when a radio wave interferes and so on. In such a case, the wireless communication apparatus 20B does not transmit BA at a specified timing, and therefore the wireless communication apparatus 20A does not receive BA from the wireless communication apparatus 20B during the BA reception period. As a result, the determination portion 232 of the wireless communication apparatus 20A determines that a requirement is not satisfied, and the wireless communication apparatus 20A transmits the A-MPDU 42E, rather than the BAR 80, to the wireless communication apparatus 20B.

When the wireless communication apparatus 20B normally receives the A-MPDU 42E which is retransmitted from the wireless communication apparatus 20A, it transits BA 70E to the wireless communication apparatus 20A. If the wireless communication apparatus 20A does not normally receive the BA 70E but a given signal (packet) is detected during the BA reception period, the determination portion 232 determines that a requirement is satisfied. In such a case, the wireless communication apparatus 20A of this embodiment transmits BAR 80E to the wireless communication apparatus 20B and receives the BA 70E in response to the BAR 80E from the wireless communication apparatus 20B.

If the communication portion 216 does not normally receive BA but the communication portion 216 receives a signal which satisfies a predetermined requirement during the BA reception period, there are possibilities that the signal may be BA or that the A-MPDU 42 which is transmitted from the communication portion 216 is received by the other wireless communication apparatus 20B. Further, it is inefficient to transmit the same A-MPDU 42 from the communication portion 216 when the A-MPDU 42 which is transmitted from the communication portion 216 is received by the other wireless communication apparatus 20B.

As described above, when the determination portion 232 determines that a requirement is satisfied, there is a possibility that the A-MPDU 42 which is transmitted from the communication portion 216 is received by the other wireless communication apparatus 20B. Thus, the control portion 236 makes control to transmit the BAR 80 from the communication portion 216 to the wireless communication apparatus 20B, thereby suppressing the useless retransmission of the A-MPDU 42 and improving the efficiency of wireless communication. On the other hand, when the determination portion 232 determines that a requirement is not satisfied, there is a possibility that the A-MPDU 42 which is transmitted from the communication portion 216 is not received by the other wireless communication apparatus 20B. Thus, the control portion 236 makes control to transmit the same A-MPDU 42 from the communication portion 216, thereby suppressing the useless retransmission of the BAR 80.

A requirement which is used by the determination portion 232 to determine the reception status is described hereinafter. The determination portion 232 determines that a requirement is satisfied when the communication portion 216 does not normally receive the BA 70 but it receives a signal which is likely to be the BA 70 during the BA reception period. Such a requirement may be set by the collaboration of the storage portion 240 and the setting portion 244.

Figure 14:
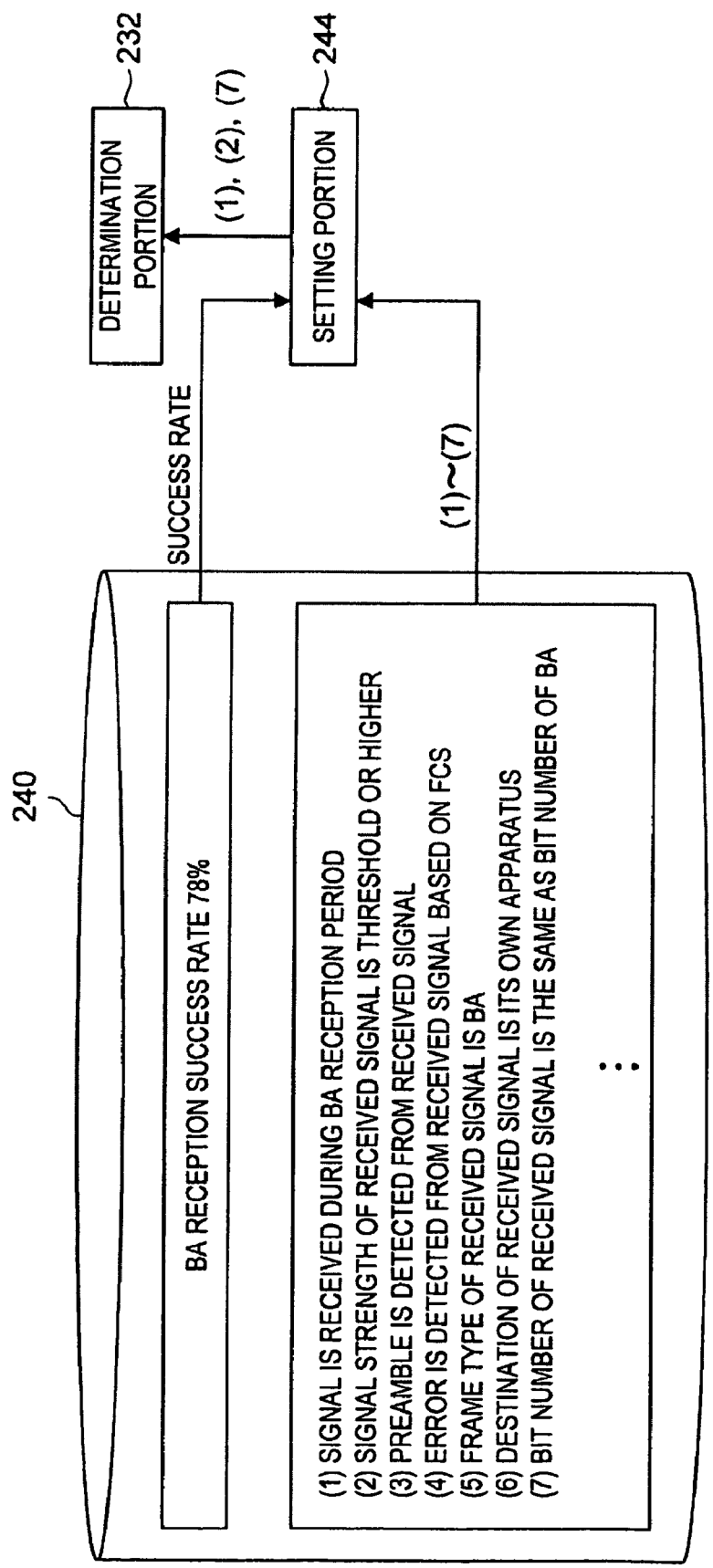
FIG. 14 is an illustration showing the way of setting a requirement.

FIG. 14 is an illustration showing the way of setting a requirement. The storage portion 240 serves as a storage medium which stores the reception history that indicates the previous reception success rate of the BA 70 or the reception result of the BA 70 as shown in FIG. 14. The reception success rate of the BA 70 which is stored in the storage portion 240 may be the previous reception success rate of the BA 70 with the same communication apparatus or the past reception success rate of the BA 70 during a specified period. The storage portion 240 stores a plurality of options for requirements.

For example, the options for requirements may include:
(1) A given signal is received by the communication portion 216 during the BA reception period;
(2) The reception strength of a received signal is equal to or higher than a predetermined threshold;
(3) A preamble is detected from a received signal;
(4) An error is detected from a received signal based on FCS;
(5) The frame type of a received signal is BA 70;
(6) The destination of a received signal is its own apparatus; and
(7) The bit number of a received signal is the same as or similar to the bit number of the BA 70.

The storage portion 240 may be nonvolatile memory such as EEPROM (Electrically Erasable Programmable Read-Only Memory) and EPROM (Erasable Programmable Read-Only Memory), magnetic disks such as hard disk and discoid magnetic disk, optical disks such as CD-R (Compact Disc Recordable)/RW (ReWritable), DVD-R (Digital Versatile Disk Recordable)/RW/+R/+RW/RAM(Random Access Memory) and BD (Blu-ray Disc (registered trademark))-R/BD-RE, or a storage medium such as MO (Magneto Optical) disk.

The setting portion 244 retrieves the reception success rate of the BA 70 and the requirement options (1) to (7) from the storage portion 240. Then, the setting portion 244 selects one or more than one options from the requirement options (1) to (7) based on the reception success rate of the BA 70 and sets the selected option as a requirement. For example, the setting portion 244 may set a stricter requirement as the reception success rate of the BA 70 is lower, and set an easier requirement as the reception success rate of the BA 70 is higher. In the example of FIG. 14, the setting portion 244 sets the condition that a given signal is received by the communication portion 216 during the BA reception period, the condition that the reception strength of a received signal is equal to or higher than a predetermined threshold, and the condition that the bit number of a received signal is the same as or similar to the bit number of the BA 70 as requirements based on the reception success rate of the BA 70.

The setting portion 244 further serves as a threshold setting portion which dynamically sets the threshold in the requirement option (2) based on the reception success rate of the BA 70. Specifically, the setting portion 244 may set a higher threshold as the reception success rate of the BA 70 is lower, and set a lower threshold as the reception success rate of the BA 70 is higher.

Although the determination portion 232 may determine the reception status by the communication portion 216 using the requirements which are set dynamically as described above, it may determine the reception status by the communication portion 216 using the requirements which are set statically. Further, the setting portion 244 may set as requirements the condition that the selected options satisfy AND or the condition that the selected options satisfy OR.

(3) Wireless Communication Method Performed in the Wireless Communication System The configuration of the wireless communication apparatus 20 according to the embodiment is described in the foregoing. An example of the wireless communication method which is performed in the wireless communication apparatus 20 is described hereinafter with reference to FIGS. 15 to 17.

(3-1) First Example of the Wireless Communication Method

A first example of the wireless communication method which is performed in the wireless communication apparatus 20 is described hereinafter with reference to FIG. 15.

Figure 15:
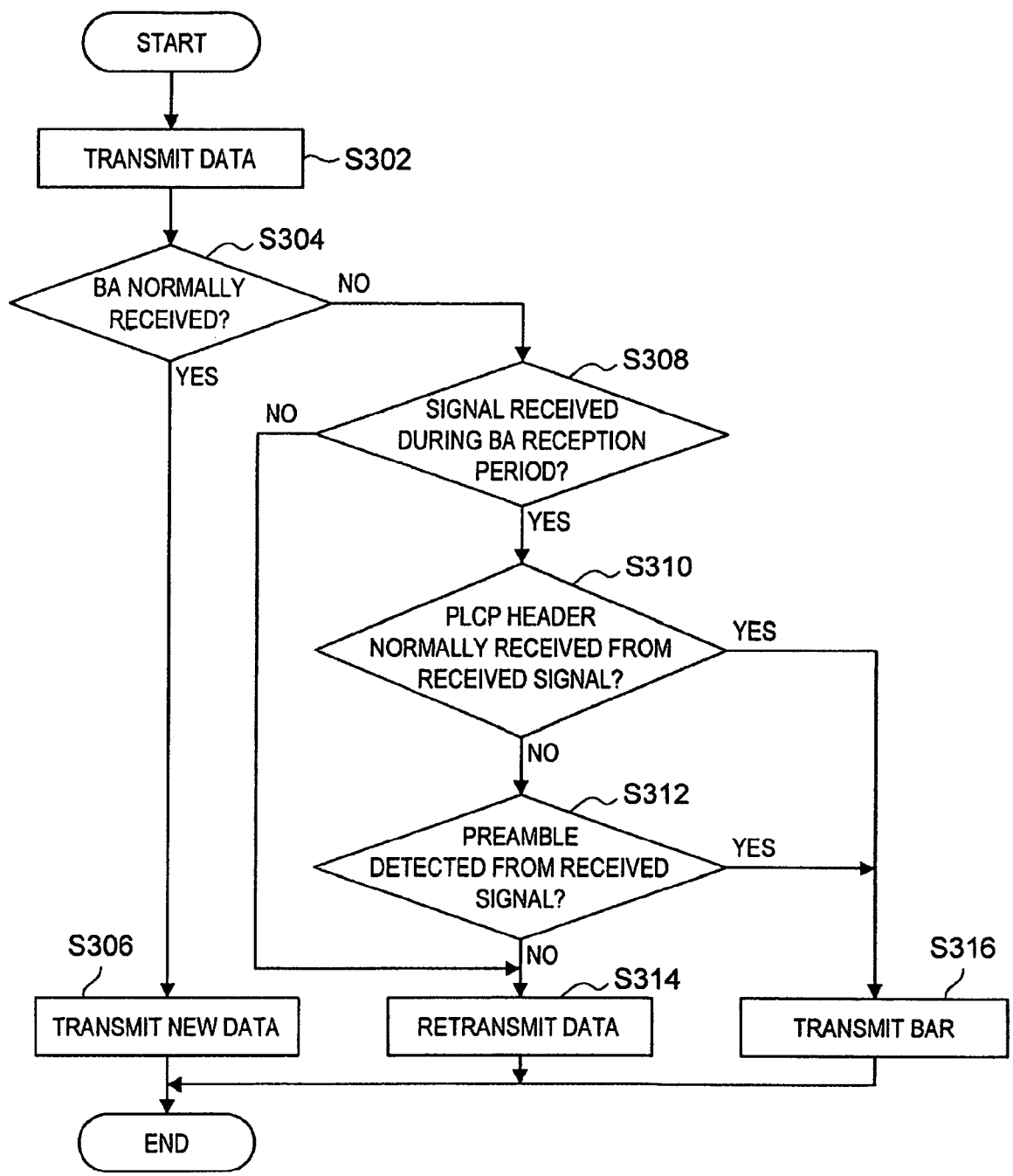
FIG. 15 is flowchart showing the flow of a first example of a wireless communication method performed in a wireless communication apparatus according to the embodiment.

FIG. 15 is a flowchart showing the flow of the first example of the wireless communication method which is performed in the wireless communication apparatus 20 according to the embodiment. First, the communication portion 216 of the wireless communication apparatus 20 transmits A-MPDU 42 (data) to the other wireless communication apparatus 20B (S302). Then, the determination portion 232 determines whether the BA 70 is normally received from the wireless communication apparatus 20B during the BA reception period (S304). In this step, the determination portion 232 may determine that the BA 70 is normally received when an error is not detected from the BA 70 based on the FCS 78 which is contained in the BA 70.

If the determination portion 232 determines that the BA 70 is normally received, the control portion 236 controls the communication portion 216 to transmit new A-MPDU 42 (data) to the other wireless communication apparatus 20B (S306). On the other hand, if the determination portion 232 determines that the BA 70 is not normally received, the determination portion 232 determines whether a given signal is received during the BA reception period (S308).

If the determination portion 232 determines that a given signal is received during the BA reception period, it then determines whether a PLCP (Physical Layer Convergence Protocol) header is normally received from a received signal (S310). If the determination portion 232 determines that the PLCP header is not normally received from the received signal, it then determines whether a preamble is detected from the received signal (S312). If the determination portion 232 determines that a given signal is not received during the BA reception period in S308 or determines that a preamble is not detected from the received signal in S312, the control portion 236 controls the communication portion 216 to retransmit the A-MPDU 42 (data) which has been transmitted from the communication portion 216 in S304 (S314).

On the other hand, if the determination portion 232 determines that the PLCP header is normally received from the received signal in S310 or determines that a preamble is detected from the received signal in S312, the control portion 236 controls the communication portion 216 to transmit the BAR 80 (S316).

Therefore, FIG. 15 shows the case where the requirements are the conditions of (a given signal is received by the communication portion 216 during the BA reception period) AND ((a PLCP header is normally received from a received signal) OR (a preamble is detected from a received signal)). Although FIG. 15 shows the blocks in the order of S308, S310 and S312, the order of the determination by the determination portion 232 is not limited thereto, and the determinations of S308, S310 and S312 may be performed in any order.

(3-2) Second Example of the Wireless Communication Method

A second example of the wireless communication method which is performed in the wireless communication apparatus 20 is described hereinafter with reference to FIG. 16.

FIG. 16 is a flowchart showing the flow of the second example of the wireless communication method which is performed in the wireless communication apparatus 20 according to the embodiment. First, the communication portion 216 of the wireless communication apparatus 20 transmits A-MPDU 42 (data) to the other wireless communication apparatus 20B (S322). Then, the determination portion 232 determines whether the BA 70 is normally received from the wireless communication apparatus 20B during the BA reception period (S324).

If the determination portion 232 determines that the BA 70 is normally received, the control portion 236 controls the communication portion 216 to transmit new A-MPDU 42 (data) to the other wireless communication apparatus 20B (S326). On the other hand, if the determination portion 232 determines that the BA 70 is not normally received, the determination portion 232 determines whether a given signal is received during the BA reception period (S328).

If the determination portion 232 determines that a given signal is received during the BA reception period, it then determines whether a PLCP header is normally received from a received signal (S330). If the determination portion 232 determines that the PLCP header is normally received from the received signal, it then determines whether the destination of the received signal is its own apparatus (S332). If the determination portion 232 determines that the destination of the received signal is not its own apparatus, it then determines whether the frame type of the received signal is the BA 70 (S334). If the determination portion 232 determines that a given signal is not received during the BA reception period in S328, determines that a PLCP header is not normally received from the received signal in S330, or determines that the frame type of the received signal is not the BA 70 in S334, the control portion 236 controls the communication portion 216 to retransmit the A-MPDU 42 (data) which has been transmitted from the communication portion 216 in S324 (S336).

On the other hand, if the determination portion 232 determines that the destination of the received signal is its own apparatus in S332 or determines that the frame type of the received signal is the BA 70 in S334, the control portion 236 controls the communication portion 216 to transmit the BAR 80 (S338).

Therefore, FIG. 16 shows the case where the requirements are the conditions of (a given signal is received by the communication portion 216 during the BA reception period) AND (a PLCP header is normally received from a received signal) AND ((the destination of a received signal is its own apparatus) OR (the frame type of a received signal is the BA 70)). Although FIG. 16 shows the blocks in the order of S328, S330, S332 and S334, the order of the determination by the determination portion 232 is not limited thereto, and the determinations of S328, S330, S332 and S334 may be performed in any order.

(3-3) Third Example of the Wireless Communication Method

A third example of the wireless communication method which is performed in the wireless communication apparatus 20 is described hereinafter with reference to FIG. 17.

FIG. 17 is a flowchart showing the flow of the third example of the wireless communication method which is performed in the wireless communication apparatus 20 according to the embodiment. First, the communication portion 216 of the wireless communication apparatus 20 transmits A-MPDU 42 (data) to the other wireless communication apparatus 20B (S342). Then, the determination portion 232 determines whether the BA 70 is normally received from the wireless communication apparatus 20B during the BA reception period (S344).

If the determination portion 232 determines that the BA 70 is normally received, the control portion 236 controls the communication portion 216 to transmit new A-MPDU 42 (data) to the other wireless communication apparatus 20B (S346). On the other hand, if the determination portion 232 determines that the BA 70 is not normally received, the determination portion 232 determines whether a signal is received at a reception strength that is equal to or higher than a predetermined threshold during the BA reception period (S348).

If the determination portion 232 determines that a signal is received at a reception strength that is equal to or higher than a predetermined threshold during the BA reception period, the control portion 236 controls the communication portion 216 to transmit the BAR 80 (S358). If the determination portion 232 determines that a signal is received at a reception strength that is not equal to or higher than a predetermined threshold during the BA reception period, it then determines whether a PLCP header is normally received from a received signal (S350). If the determination portion 232 determines that the PLCP header is normally received from the received signal, it then determines whether the destination of the received signal is its own apparatus (S352). If the determination portion 232 determines that the destination of the received signal is not its own apparatus, it then determines whether the frame type of the received signal is the BA 70 (S354). If the determination portion 232 determines that a PLCP header is not normally received from the received signal in S350, or determines that the frame type of the received signal is not the BA 70 in S354, the control portion 236 controls the communication portion 216 to retransmit the A-MPDU 42 (data) which has been transmitted from the communication portion 216 in S344 (S356).

On the other hand, if the determination portion 232 determines that a signal is received at a reception strength that is not equal to or higher than a predetermined threshold during the BA reception period in S348, determines that the destination of the received signal is its own apparatus in S352 or determines that the frame type of the received signal is the BA 70 in S354, the control portion 236 controls the communication portion 216 to transmit the BAR 80 (S358).

Therefore, FIG. 17 shows the case where the requirements are the conditions of (a signal is received by the communication portion 216 at a reception strength that is equal to or higher than a predetermined threshold during the BA reception period) OR ((a PLCP header is normally received from a received signal) AND ((the destination of a received signal is its own apparatus) OR (the frame type of a received signal is the BA 70))). Although FIG. 17 shows the blocks in the order of S348, S350, S352 and S354, the order of the determination by the determination portion 232 is not limited thereto, and the determinations of S348, S350, S352 and S354 may be performed in any order.

(4) Summary

As described in the foregoing, in the wireless communication apparatus 20 of the embodiment, even if the communication portion 216 does not normally receive the BA 70 from the other wireless communication apparatus 20B during the BA reception period, when the communication portion 216 receives a signal which satisfies a predetermined requirement and is thus likely to be the BA 70 during the BA reception period, the communication portion 216 transmits the BAR 80 to the other wireless communication apparatus 20B. This suppresses the needless retransmission of the A-MPDU 42 and thereby improves the efficiency of wireless communication. On the other hand, if the determination portion 232 determines that the requirement is not satisfied, there is a possibility that the other wireless communication apparatus 20B does not receive the A-MPDU 42 which is transmitted from the communication portion 216, and therefore the control portion 236 controls the communication portion 216 to retransmit the same A-MPDU 42, thereby suppressing the needless transmission of the BAR 80.

It should be understood by those skilled in the art that various modifications, combinations, sub-combinations and alterations may occur depending on design requirements and other factors insofar as they are within the scope of the appended claims or the equivalents thereof.

For example, it is not necessary to perform each step in the processing of wireless communication apparatus 20 in chronological order according to the sequences shown in the flowcharts, and the processing which is performed in parallel or individually (e.g. parallel processing or object processing) may be included.

Furthermore, it is possible to create a computer program that causes the hardware such as the CPU 201, the ROM 202 and the RAM 203 which are built in the wireless communication apparatus 20 to perform the equal function to the elements of the wireless communication apparatus 20 described above. Further, a storage medium which stores such the above computer program may be provided. Furthermore, an integrated circuit, a chip or the like which implements the functions of the elements the wireless communication apparatus 20 such as the received signal analysis portion 228, the determination portion 232 and the control portion 236 may be also provided.

What is claimed is:

1. A wireless communication apparatus comprising:
a transmitting portion to transmit a data signal to other wireless communication apparatus;
a receiving portion to receive a reception confirmation signal indicating reception of the data signal by the other wireless communication apparatus from the other wireless communication apparatus during a specified period;
a storage portion to store a reception success rate of the reception confirmation signal by the receiving portion and a plurality of conditions;
a setting portion to retrieve the reception success rate and the conditions from the storage portion, the setting portion to select and set a predetermined requirement from the conditions based on the reception success rate;
a determination portion to determine that the predetermined requirement is satisfied if the receiving portion receives a given signal during the specified period;
a control portion to control the transmitting portion to request the other wireless communication apparatus to retransmit the reception confirmation signal if the receiving portion does not normally receive the reception confirmation signal and the determination portion determines that the predetermined requirement is satisfied; and
wherein the retransmit request includes a different data format then the data signal.

2. The wireless communication apparatus according to claim 1, wherein
the determination portion determines that the requirement is satisfied further if a reception strength of the given signal is equal to or higher than a threshold.

3. The wireless communication apparatus according to claim 1, wherein
the determination portion determines that the requirement is satisfied further if a preamble is detected from the given signal.

4. The wireless communication apparatus according to claim 1, wherein
the given signal contains error detection data for detecting an error of data represented by the given signal, and
the determination portion determines that the requirement is satisfied further if an error is detected from data represented by the given signal based on the error detection data.

5. The wireless communication apparatus according to claim 1, wherein
the determination portion determines that the requirement is satisfied further if a destination of the given signal is its own apparatus.

6. The wireless communication apparatus according to claim 1, wherein
the determination portion determines that the requirement is satisfied further if the given signal is a data frame of the reception confirmation signal.

7. The wireless communication apparatus according to claim 1, wherein the determination portion determines that the requirement is satisfied further if a data amount of the given signal is the same as or similar to a data amount of the reception confirmation signal.

8. The wireless communication apparatus according to claim 2, further comprising:
a threshold setting portion to dynamically set the threshold based on the reception success rate.

9. The wireless communication apparatus according to claim 4, wherein
the determination portion determines that the requirement is satisfied if a destination of the given signal is its own apparatus or the given signal is a data frame of the reception confirmation signal; and
if an error is detected from data represented by the given signal based on the error detection data.

10. A non-transitory computer-readable storage medium storing a computer program which, when executed by a computer, serves as a wireless communication apparatus performing a wireless communication method, the method including:
transmitting a data signal to other wireless communication apparatus;
receiving a reception confirmation signal indicating reception of the data signal by the other wireless communication apparatus from the other wireless communication apparatus during a specified period;
storing a reception success rate of the reception confirmation signal and a plurality of conditions;
selecting and setting a predetermined requirement from the conditions based on the reception success rate;
determining whether the predetermined requirement is satisfied when a given signal is received during the specified period;
requesting the other wireless communication apparatus to retransmit the reception confirmation signal if the reception confirmation signal is not normally received if the predetermined requirement is satisfied; and
wherein the retransmit request includes a different data format then the data signal.

11. A wireless communication method performed in a wireless communication apparatus comprising the steps of:
transmitting a data signal to other wireless communication apparatus;
storing a reception success rate of a reception confirmation signal and a plurality of conditions;
selecting and setting a predetermined requirement from the conditions based on the reception success rate;
determining whether the predetermined requirement is satisfied when a given signal is received during a specified period where a reception confirmation signal indicating reception of the data signal by the other wireless communication apparatus is expected to be transmitted from the other wireless communication apparatus;
requesting the other wireless communication apparatus to retransmit the reception confirmation signal if the reception confirmation signal is not normally received and the given signal is received during the specified period; and
wherein the retransmit request includes a different data format then the data signal.

12. A wireless communication system including a plurality of wireless communication apparatus wirelessly communicating with each other, each wireless communication apparatus comprising:
a transmitting portion to transmit a data signal to other wireless communication apparatus;
a receiving portion to receive a reception confirmation signal indicating reception of the data signal by the other wireless communication apparatus from the other wireless communication apparatus during a specified period;
storing a reception success rate of the reception confirmation signal by the receiving portion and a plurality of conditions;
selecting and setting a predetermined requirement from the conditions based on the reception success rate;
a determination portion to determine that the predetermined requirement is satisfied if the receiving portion receives a given signal during the specified period;
a control portion to control the transmitting portion to request the other wireless communication apparatus to retransmit the reception confirmation signal if the receiving portion does not normally receive the reception confirmation signal and the determination portion determines that the predetermined requirement is satisfied; and
wherein the retransmit request includes a different data format then the data signal.

* * * * *